US012090676B2

(12) United States Patent
Walker, Jr.

(10) Patent No.: US 12,090,676 B2
(45) **Date of Patent: *Sep. 17, 2024**

(54) SHAVING RAZOR CARTRIDGE

(71) Applicant: The Gillette Company LLC, Boston, MA (US)

(72) Inventor: Vincent Paul Walker, Jr., Bridgewater, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,172

(22) Filed: Apr. 5, 2023

(65) Prior Publication Data

US 2023/0234251 A1 Jul. 27, 2023

Related U.S. Application Data

(60) Continuation of application No. 17/405,678, filed on Aug. 18, 2021, now Pat. No. 11,648,698, and a (Continued)

(51) Int. Cl.
*B26B 21/40* (2006.01)
*B26B 21/22* (2006.01)

(52) U.S. Cl.
CPC ........ *B26B 21/4012* (2013.01); *B26B 21/225* (2013.01); *B26B 21/4018* (2013.01); *B26B 21/4025* (2013.01); *B26B 21/4031* (2013.01)

(58) Field of Classification Search
CPC ......... B26B 21/14; B26B 21/16; B26B 21/22; B26B 21/40; B26B 21/4012; B26B 21/4018; B26B 21/4025; B26B 21/4031
(Continued)

(56) References Cited

U.S. PATENT DOCUMENTS

| | | |
|---|---|---|
| 1,418,191 A | 5/1922 | McGarvey |
| 1,633,139 A | 6/1927 | Staats-Oels |

(Continued)

FOREIGN PATENT DOCUMENTS

| | | |
|---|---|---|
| CN | 202878368 U | 4/2013 |
| EP | 2537648 A1 | 12/2012 |

(Continued)

OTHER PUBLICATIONS

PCT Search Report and Written Opinion for PCT/US2018/036208 dated Sep. 20, 2018, 13 pages.

*Primary Examiner* — Jason Daniel Prone
(74) *Attorney, Agent, or Firm* — John M. Lipchitz

(57) ABSTRACT

A shaving cartridge with a housing having a primary guard and a secondary cap. A bridge member is integrally molded with the housing. The bridge member has a plurality of spaced apart parallel ribs. The plurality of spaced part ribs define a primary cap surface and a secondary guard surface. A first blade having a cutting edge is mounted to the housing between the primary guard and the primary cap surface. A second blade having a cutting edge extending in a same direction as the cutting edge of the first blade is mounted to the housing between the secondary guard surface and the secondary cap. The cutting edge of the first blade and the cutting edge of the second blade define an interblade span greater than 3.0 mm. The plurality of spaced apart parallel ribs define a plurality of rinse openings extending through the bridge member.

5 Claims, 9 Drawing Sheets

Related U.S. Application Data division of application No. 15/975,819, filed on May 10, 2018, now Pat. No. 11,117,278, said application No. 17/405,678 is a division of application No. 15/975,819, filed on May 10, 2018, now Pat. No. 11,117,278.

(60) Provisional application No. 62/515,945, filed on Jun. 6, 2017.

(58) Field of Classification Search
USPC ....... 30/47–51, 59, 65, 70, 74.1; D28/44–48
See application file for complete search history.

(56) References Cited

U.S. PATENT DOCUMENTS 1,890,334 A 12/1932 Muros
2,505,493 A 4/1950 Fred
3,317,940 A 5/1967 Ludwig
3,657,692 A 4/1972 Wormser
3,786,563 A 1/1974 Dorion, Jr.
3,934,338 A 1/1976 Braginetz
3,940,853 A 3/1976 Francis
4,063,354 A 12/1977 Oldroyd et al.
4,084,316 A 4/1978 Francis
4,226,019 A 10/1980 Sugiyama
4,257,160 A 3/1981 Murai
4,272,885 A 6/1981 Ferraro
4,389,773 A 6/1983 Nissen
4,403,412 A 9/1983 Trotta
4,403,413 A 9/1983 Trotta
4,485,554 A 12/1984 Bergamaschi
4,492,025 A 1/1985 Jacobson
4,562,644 A 1/1986 Hitchens
4,586,255 A 5/1986 Jacobson
4,831,731 A 5/1989 Elits
4,850,106 A 7/1989 Braun et al.
4,875,287 A 10/1989 Creasy et al.
4,875,288 A 10/1989 Trotta et al.
5,113,585 A 5/1992 Rogers et al.
5,224,267 A 7/1993 Simms et al.
5,341,571 A 8/1994 Prochaska
5,347,714 A 9/1994 Prochaska
5,359,774 A 11/1994 Althaus
5,369,885 A 12/1994 Ferraro
5,402,574 A 4/1995 Milner
5,456,009 A 10/1995 Wexler
5,461,781 A 10/1995 Pirc
5,522,137 A 6/1996 Andrews
5,546,660 A 8/1996 Burout et al.
5,551,155 A 9/1996 Prochaska
5,630,275 A 5/1997 Wexler
5,666,729 A 9/1997 Ferraro
5,713,131 A 2/1998 Rogers et al.
5,761,814 A 6/1998 Anderson et al.
5,802,721 A 9/1998 Wain et al.
6,141,875 A 11/2000 Andrews
6,161,288 A 12/2000 Andrews
6,173,498 B1 1/2001 Warrick et al.
6,176,014 B1 1/2001 Garraway
6,243,951 B1 6/2001 Oldroyd
6,298,558 B1 10/2001 Tseng
6,305,084 B1 10/2001 Zucker
6,378,211 B1 4/2002 McCool et al.
6,397,473 B1 6/2002 Clark
6,434,828 B1 8/2002 Andrews
6,442,840 B2 9/2002 Zucker
6,550,141 B1 4/2003 Rivers et al.
6,655,029 B2 12/2003 Saito
6,655,030 B2 12/2003 Zuidervaart
6,769,180 B2 8/2004 Coffin
6,944,952 B1 9/2005 Tseng
7,086,160 B2 8/2006 Coffin et al.
7,111,401 B2 9/2006 Richard
D563,044 S 2/2008 Ramm
D575,454 S 8/2008 Keene
D604,904 S 11/2009 Watson
7,681,314 B2 3/2010 Follo
D617,947 S 6/2010 Lukan et al.
D617,949 S 6/2010 Lukan et al.
7,730,619 B2 6/2010 Ozenick
D631,198 S 1/2011 Adams
7,882,610 B2 2/2011 Gratsias et al.
D638,580 S 5/2011 Adams
8,209,867 B2 7/2012 Clarke
D665,948 S 8/2012 Jessemey et al.
8,234,789 B2 8/2012 Avens et al.
8,307,553 B2 11/2012 Follo et al.
8,327,546 B2 12/2012 Tucker et al.
8,336,212 B2 12/2012 Bozikis et al.
8,413,334 B2 4/2013 Walker, Jr. et al.
8,415,522 B2 4/2013 Gutierrez
8,479,398 B2 7/2013 Coresh
8,533,961 B2 9/2013 Gester et al.
8,544,177 B2 10/2013 Rawle et al.
8,603,961 B2 12/2013 Panandiker
8,707,561 B1 4/2014 Kneier
8,726,518 B2 5/2014 Bruno
D707,885 S 6/2014 Cataudella
9,015,951 B2 4/2015 Howell et al.
9,032,628 B2 5/2015 Hobson, Sr. et al.
9,144,914 B2 9/2015 Coresh
D741,008 S 10/2015 Bruno et al.
D741,009 S 10/2015 Bruno et al.
D741,010 S 10/2015 Wang et al.
D741,011 S 10/2015 Forti et al.
D741,546 S 10/2015 Witkus et al.
9,149,944 B2 10/2015 Hobson, Sr. et al.
D744,165 S 11/2015 Tucker et al.
D749,265 S 2/2016 Cataudella
9,259,846 B1 2/2016 Robertson
D764,101 S 8/2016 Cataudella
9,415,522 B2 8/2016 Oglesby et al.
D766,506 S 9/2016 Bruno et al.
9,457,486 B2 10/2016 Coresh
D772,484 S 11/2016 Otsuka
D776,875 S 1/2017 Ren et al.
9,555,947 B2 1/2017 Su et al.
D779,121 S 2/2017 Bruno et al.
D779,730 S 2/2017 Bruno et al.
9,718,200 B2 8/2017 Dryfhout
9,821,480 B2 11/2017 Coresh
9,890,348 B2 2/2018 Cohen
D829,992 S 10/2018 Hage et al.
10,155,320 B2 12/2018 Ren
D850,721 S 6/2019 Liberatore
D869,767 S 12/2019 Watson et al.
10,532,472 B2 1/2020 Maras et al.
10,562,198 B2 2/2020 Clarke et al.
D877,983 S 3/2020 Walker, Jr. et al.
10,773,401 B2 9/2020 Walker, Jr. et al.
10,773,402 B2 9/2020 Walker, Jr. et al.
D902,485 S 11/2020 Goeder et al.
D908,285 S 1/2021 Cataudella et al.
D921,984 S 6/2021 Brissett et al.
11,117,278 B2 9/2021 Walker, Jr.
D940,394 S 1/2022 Fyfield et al.
D947,451 S 3/2022 Fernald et al.
D951,541 S 5/2022 Fyfield et al.
D961,849 S 8/2022 Brissett et al.
11,413,775 B2 8/2022 Walker, Jr. et al.
D965,222 S 9/2022 Fyfield et al.
11,648,698 B2 * 5/2023 Walker, Jr. ............ B26B 21/225
30/50
2002/0066186 A1 6/2002 White et al.
2002/0095791 A1 7/2002 Pennella et al.
2003/0159291 A1 8/2003 Clark
2003/0217470 A1 11/2003 Follo et al.
2004/0128835 A1 7/2004 Coffin et al.
2004/0181949 A1 9/2004 Coffin et al.
2004/0231161 A1 11/2004 Coffin et al.
2004/0255467 A1 12/2004 Lembke et al.
2004/0261271 A1 12/2004 Coffin
2005/0115073 A1 6/2005 Brown et al.

(56) References Cited

U.S. PATENT DOCUMENTS

| | | | |
|---|---|---|---|
| 2005/0198842 | A1 | 9/2005 | Walker et al. |
| 2006/0064875 | A1 | 3/2006 | Follo et al. |
| 2008/0256803 | A1 | 10/2008 | Tucker et al. |
| 2010/0170094 | A1 | 7/2010 | Hayashi |
| 2010/0218381 | A1 | 9/2010 | Follo |
| 2010/0281694 | A1 | 11/2010 | Royle |
| 2011/0146079 | A1 | 6/2011 | Clarke et al. |
| 2011/0203113 | A1 | 8/2011 | Wang |
| 2011/0219625 | A1 | 9/2011 | Bryan |
| 2011/0283539 | A1 | 11/2011 | Bryan |
| 2011/0289779 | A1 | 12/2011 | Volodin et al. |
| 2012/0110857 | A1 | 5/2012 | Peterson et al. |
| 2012/0151772 | A1 | 6/2012 | Moon |
| 2012/0317818 | A1 | 12/2012 | Oglesby |
| 2012/0324737 | A1 | 12/2012 | Howell et al. |
| 2014/0000082 | A1 | 1/2014 | Xu |
| 2014/0230252 | A1 | 8/2014 | Davos |
| 2014/0259677 | A1 | 9/2014 | Coresh |
| 2014/0331500 | A1 | 11/2014 | Ren |
| 2015/0090085 | A1 | 4/2015 | Griffin et al. |
| 2015/0158190 | A1 | 6/2015 | Georgakis et al. |
| 2015/0158191 | A1 | 6/2015 | Jeong et al. |
| 2015/0283715 | A1 | 10/2015 | Stephens et al. |
| 2016/0001454 | A1 | 1/2016 | Coresh |
| 2016/0089800 | A1 | 3/2016 | Coresh |
| 2016/0107324 | A1 | 4/2016 | Robertson et al. |
| 2016/0143836 | A1 | 5/2016 | Hayes et al. |
| 2016/0297086 | A1 | 10/2016 | Efthimiadis et al. |
| 2016/0332313 | A1 | 11/2016 | Oconnor |
| 2017/0028577 | A1 | 2/2017 | Ntavos et al. |
| 2017/0151683 | A1 | 6/2017 | Bozikis et al. |
| 2017/0151684 | A1 | 6/2017 | Bozikis et al. |
| 2017/0217033 | A1 | 8/2017 | Tucker et al. |
| 2017/0341247 | A1 | 11/2017 | Zafiropoulos et al. |
| 2017/0348866 | A1 | 12/2017 | Psimadas et al. |
| 2018/0071929 | A1 | 3/2018 | Walker, Jr. |
| 2018/0071930 | A1 | 3/2018 | Walker, Jr. et al. |
| 2018/0071931 | A1 | 3/2018 | Walker, Jr. et al. |
| 2018/0345511 | A1 | 12/2018 | Clarke et al. |
| 2018/0345512 | A1 | 12/2018 | Walker, Jr. |
| 2018/0361604 | A1 | 12/2018 | Bozikis et al. |
| 2019/0061184 | A1 | 2/2019 | Lin et al. |
| 2019/0202076 | A1 | 7/2019 | Park et al. |
| 2019/0224874 | A1 | 7/2019 | Blatter et al. |
| 2019/0299455 | A1 | 10/2019 | Patel et al. |
| 2019/0299464 | A1 | 10/2019 | Washington et al. |
| 2019/0299472 | A1 | 10/2019 | Johnson et al. |
| 2019/0299477 | A1 | 10/2019 | Johnson et al. |
| 2020/0368927 | A1 | 11/2020 | O'Connor et al. |
| 2020/0398449 | A1 | 12/2020 | Claus et al. |
| 2021/0245378 | A1 | 8/2021 | Blatter et al. |
| 2021/0323180 | A1 | 10/2021 | Shen et al. |
| 2021/0379781 | A1 | 12/2021 | Walker, Jr. |

FOREIGN PATENT DOCUMENTS

| | | | |
|---|---|---|---|
| JP | S5078493 | U | 7/1975 |
| JP | H0436972 | U | 3/1992 |
| JP | H0631666 | U | 4/1994 |
| JP | H0636577 | U | 5/1994 |
| WO | 9602370 | A1 | 2/1996 |
| WO | 9717174 | A2 | 5/1997 |
| WO | 2016109136 | A1 | 7/2016 |

* cited by examiner

SHAVING RAZOR CARTRIDGE

This application is a continuation from U.S. application Ser. No. 17/405,678 now U.S. Pat. No. 11,648,698 which is a divisional from U.S. application Ser. No. 15/975,819 now U.S. Pat. No. 11,117,278.

FIELD OF THE INVENTION

The present invention relates to shaving razors and more particularly to shaving cartridges having two guards, two caps, and a plurality of blades.

BACKGROUND OF THE INVENTION

In general, shaving razors of the wet shave type include a cartridge or blade unit with at least one blade with a cutting edge, which is moved across the surface of the skin being shaved by means of a handle to which the cartridge is attached. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled (i.e., disposable razor). The connection of the cartridge to the handle provides a pivotal mounting of the cartridge with respect to the handle so that the cartridge angle adjusts to follow the contours of the surface being shaved. In such systems, the cartridge can be biased toward a rest position by the action of a spring-biased plunger (a cam follower) carried on the handle against a cam surface on the cartridge housing.

Razor cartridges usually include a guard which contacts the skin in front of the blade(s) and a cap for contacting the skin behind the blade(s) during shaving. The cap and the guard aid in establishing the so-called "shaving geometry", i.e., the parameters which determine the blade orientation and position relative to the skin during shaving, which in turn have a strong influence on the shaving performance and efficacy of the razor. The cap and the guard may aid in establishing the exposure of the blades. The blade exposure is defined to be the perpendicular distance or height of the blade edge measured with respect to a plane tangential to the skin contacting surfaces of the blade unit elements next in front of and next behind the edge. Therefore, for a three-bladed blade unit, the exposure of the first or primary blade is measured with reference to a plane tangential to the guard and the edge of the second blade, and the exposure of the third or tertiary blade is measured with reference to a plane tangential to the edge of the second blade and the cap.

The minimum acceptable exposure may be influenced by other blade unit dimensions, such as the distance from the skin engaging surface of the guard to the edge, i.e. "the span" of the primary blade. As referred to herein, "the span" means the distance from the blade edge to the skin contacting element immediately in front of that edge as measured along a tangent line extending between the said element and the blade edge. The guard may include a generally rigid guard bar that may be formed integrally with the housing or platform structure, which provides a support for the blades. Guards may also include skin stretching elements made from various types of elastomeric materials that are intended to stretch the skin and/or align hair in front of the blade.

Safety razors having cartridges with several blades have in recent years been sold in very large numbers and are generally acknowledged to give a better quality of shave, especially in terms of closeness, than single bladed razors. A blade unit having many blades can produce a closer shave than a similar blade unit with only one or two blades. However, closeness of shave obtained is only one parameter by which razor users judge the performance of a razor. Comfort is another important characteristic to consider. For example, many consumers describe themselves as having sensitive skin, which is prone to nicks, cuts and irritation. Discomfort during a shave, often described by shavers as a "pull & tug" sensation is caused by the nerves around the follicle being stimulated. This nerve stimulation can happen by moving the hairs, pulling and/or cutting the hairs and by dragging the razor cartridge over the surface of the skin.

Additionally, many consumers suffer from acne and/or pseudofolliculitis barbae (PFB) that make shaving uncomfortable. PFB or shaving bumps is a foreign body inflammatory reaction involving papules and pustules. It is a common dermatologic condition principally affecting adult men who have naturally coarse or tightly curling hair, particularly those who shave closely on a regular basis. The leading edge of closely cropped facial hair re-entering the epidermis of the skin or transecting the wall of the hair follicle results in localized inflammatory reactions over the affected site. The process can lead to secondary skin infections and, in severe cases, permanent scarring. Accordingly, what is needed is a shaving razor cartridge that provides a more comfortable shave and/or decrease skin issues caused by shaving the face and body (e.g., PFB, irritation, redness, razor bumps, ingrown hairs, acne etc.).

SUMMARY OF THE INVENTION

In one aspect, the invention features, in general, a shaving cartridge with a housing, having a primary guard at a front of the housing and a secondary cap at a rear of the housing. A bridge member having a primary cap surface and a secondary guard surface is positioned between the primary guard and the secondary cap. A first blade has a cutting edge. The first blade is mounted to the housing between the primary guard and the primary cap surface. A second blade having a cutting edge extending in the same direction as the cutting edge of the first blade is mounted to the housing between the secondary guard surface and the secondary cap. A width of the bridge member is greater than 50% of an interblade span between the cutting edge of the first blade and the cutting edge of the second blade and the interblade span is greater than 3 mm.

In another aspect, the invention features, in general, a shaving cartridge with a shaving cartridge with a housing, having a primary guard at a front of the housing and a secondary cap at a rear of the housing. A bridge member having a primary cap surface and a secondary guard surface is positioned between the primary guard and the secondary cap. The bridge member has a plurality of spaced apart ribs extending transverse to the cutting edge of the first blade and defining a plurality of openings. A first blade has a cutting edge. The first blade is mounted to the housing between the primary guard and the primary cap surface. A second blade having a cutting edge extending in the same direction as the cutting edge of the first blade is mounted to the housing between the secondary guard surface and the secondary cap. A width of the bridge member is about 2.5 mm to about 4 mm.

In another aspect, the invention features, in general, a shaving cartridge with a housing having a primary guard at a front of the housing and a secondary cap at a rear of the housing. A bridge member has a primary cap surface and a secondary guard surface positioned between the primary guard and the secondary cap. A first blade has a cutting edge. The first blade is mounted to the housing between the primary guard and the primary cap surface. A second blade has a cutting edge extending in the same direction as the cutting edge of the first blade. The second blade is mounted to the housing between the secondary guard surface and the secondary cap. A top surface of the bridge member is positioned independently of a position of the cutting edges.

The details of one or more embodiments of the invention are set forth in the accompanying drawings and the description below. Other features and advantages of the invention will be apparent from the description and drawings, and from the claims.

DETAILED DESCRIPTION OF THE INVENTION

Figure 1:
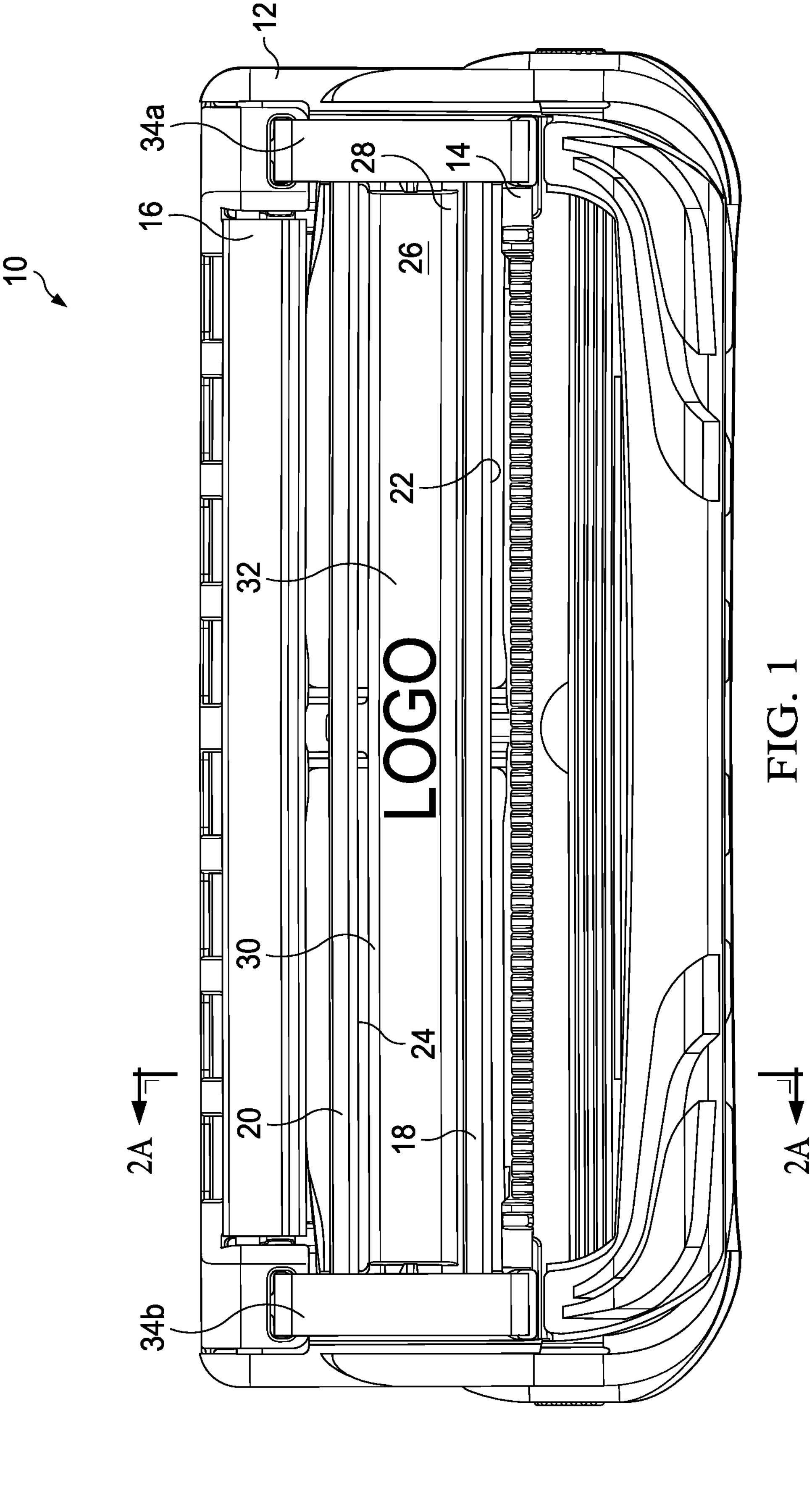
FIG. 1 is a top view of a shaving razor cartridge.

Referring to FIG. 1, a top view is shown of a shaving razor cartridge 10. The shaving razor cartridge 10 may include a housing 12 having a primary guard 14 toward a front of the housing 12 and a secondary cap 16 toward a rear of the housing 12. In certain embodiments, there may be a first blade 18 and a second blade 20 mounted to the housing 12 between the primary guard 14 and the secondary cap 16. Each of the blades 18 and 20 may have a respective cutting edge 22 and 24 facing in the same direction (e.g., toward the primary guard 14). The blades 18 and 20 may be spring loaded within the housing 12 such that the blades 18 and 20 are biased against one or more clips **34*a* and 34*b*. In certain embodiments, the clips 34*a* and 34*b* may allow the blades 18 and 20** to move in an up and down direction during a shaving stroke.

A bridge member 26 may be positioned between the first blade 18 and the second blade 20. The bridge member 26 may have a primary cap surface 28 and a secondary guard surface 30. Accordingly, the primary guard 18 and the primary cap surface 28 may establish a shaving plane for the first cutting edge 22. Similarly, the secondary guard surface 30 and the secondary cap 16 may establish the shaving plane for the second cutting edge 24. The primary cap surface 28 and the secondary guard surface 30 may be a unitary member that is molded integrally with the bridge member 26 and the housing 12. The bridge member 26 may have a top surface 32 between the primary cap surface 28 and the secondary guard surface 30.

As will be explained in greater detail below, the blades 18 and 20 may be secured to the housing 12 with the at least one clip **34*a* and 34*b* may be bent around a portion of the housing 12. Although the clips 34*a* and 34*b* are shown as two separate components fixing the blades 18 and 20 and bridge member 26 to the housing 12, the clips 34*a* and 34*b* may also be a single piece construction. In addition, the clips 34*a* and 34*b* may not necessarily be bent or formed around a portion of the housing 12 to secure the blades 18 and 20 and the bridge member 26 relative to the housing 12. For example, the clips 34*a* and 34*b* may be snapped fit, press fit, glued, or ultrasonically welded to the housing 12. The clips 34*a* and 34*b* may comprise a metal (e.g., aluminum or stainless steel) or a polymeric material (e.g., Noryl™ (a blend of polyphenylene oxide (PPO) and polystyrene developed by General Electric Plastics, now SABIC Innovative Plastics), acrylonitrile butadiene styrene (ABS), acetal, polypropylene, high impact polystyrene, or any combinations thereof. The clips 34*a* and 34*b* may contact the cutting edges 22 and 24 of the respective blades 18 and 20. In certain embodiments, the clips 34*a* and 34*b* may be spaced apart (i.e., not in contact) from the primary cap surface 28 and/or the secondary guard surface 30. The spacing of the clips 34*a* and 34*b* from the bridge member 26 may facilitate proper skin contact of the bridge member 26 and the cutting edges 22 and 24. For example, if the clips 34*a* and 34*b* extended over or around the bridge member 26, then the clips 34*a* and 34*b* may prevent proper skin and hair contact with the cutting edges 22 and 24. Furthermore, the position of the bridge member 26 would be limited by the bottom surface of the clips 34*a* and 34*b*. In certain embodiments, it may be advantageous for the primary cap surface 28 and the secondary guard surface 30 of the bridge member 26 to be positioned on a plane above the cutting edges 22 and 24. The cutting edges may be preloaded against the bottom surface of the clips 34*a* and 34*b*. The positioning of the bridge member 26 above the cutting edges 22 and 24** may allow for a more comfortable shave.

It is believed, without being held to theory, that it is possible to minimize skin irritation and PFB by cutting hair close to skin level, but not below the skin's surface. Multi-blade shaving razor cartridges take advantage of what is known as the hysteresis effect. Hysteresis is the meta-stable extension of hair that occurs after a hair is cut during shaving. In present day razors, sharp cutting edges of the cartridge engage with individual hairs during a shaving stroke, exerting a force on the hairs and causing them to be lifted out of the follicle as the razor is moved across the surface of the skin. Once the hair has been cut and the force is removed, the hair retracts back into the skin. However, in multi-bladed systems, a trailing blade (i.e., second blade) engages the hair and cuts it before the hair is able to retract back into the skin. This concept of consecutive blades cutting hairs before they have fully retracted into the skin is known as "hysteresis cutting". If the second and consecutive blades also engage and pull hairs while cutting, it becomes possible to get a significantly closer cut than when using a single blade razor.

In razor cartridges with multiple, closely spaced blades it is possible that a single hair may be subjected to engagement with more than one blade during a single cutting episode, multiplying the stimulation of the nerve and the sensation of discomfort. Less closely spaced blades are less likely to engage the same hair in a single cutting episode and therefore less likely to exaggerate nerve stimulation, and discomfort. It is believed, without being held to theory, that decreasing the likelihood of single hairs engaging with multiple blades during a cutting episode may reduce uncomfortable nerve stimulation. Furthermore, decreasing the likelihood of single hairs engaging with multiple blades during a cutting episode may help prevent the hair from being cut too close or below the skin's surface which may limit growing hair from hair re-entering the epidermis of the skin.

Figure 2A:
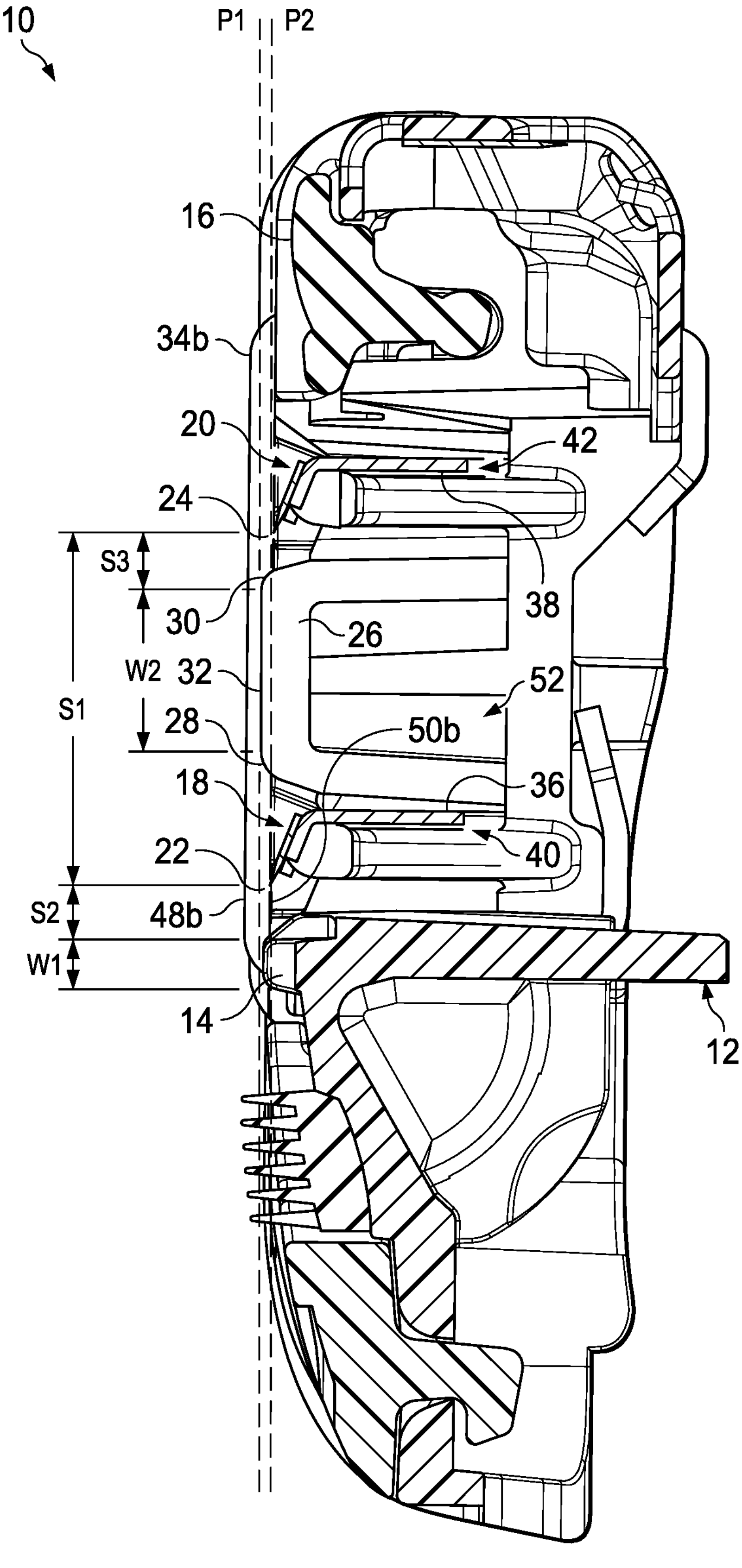
FIG. 2A is a section view of the shaving razor cartridge, taken generally along the line 2-2 of FIG. 1.
Figure 2B:
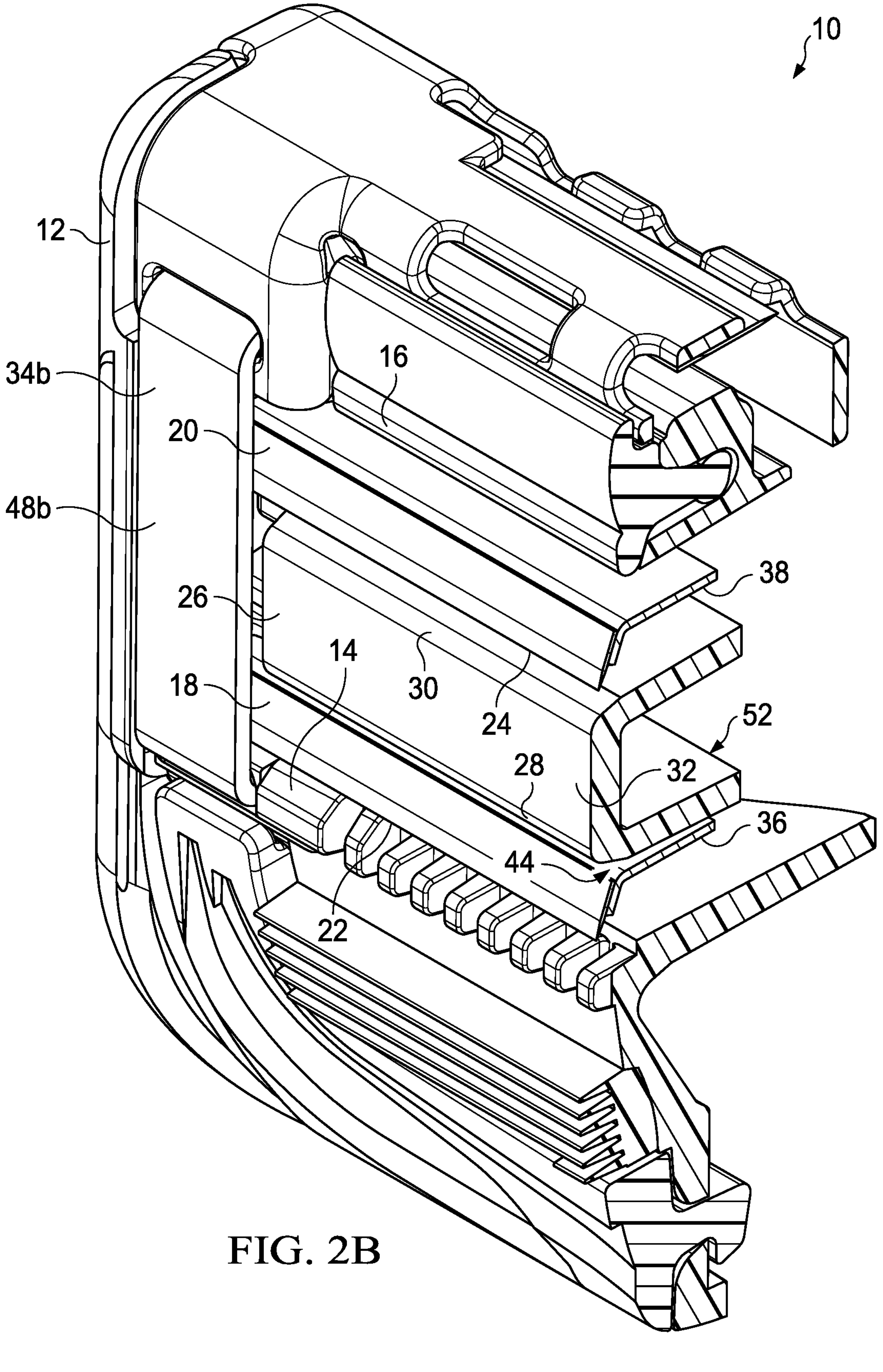
FIG. 2B is a perspective section view of the shaving razor cartridge, taken generally along the line 2-2 of FIG. 1.

Referring to FIGS. 2A and 2B, cross section views of the shaving razor cartridge 10 are shown, taken generally along the line 2-2 of FIG. 1. FIG. 2A illustrates the cross section from a side view and FIG. 2B illustrates the cross section from a perspective view. The blades 18 and 20 may have a respective blade support member 36 and 38. The blade support members 36 and 38 may be a unitary part of the blades 18 and 20 or alternatively, the blades 18 and 20 may be mounted to the respective blade support members 36 and 38. The blade support members 36 and 38 may be positioned within a respective blade slot 40 and 42 in the housing 12. In certain embodiments, the first blade 18 (e.g., blade support member 36) may be spaced apart from the bridge member 26 to define a rinse channel 44 there between (see FIG. 2B). Accordingly, less shaving debris may be present when the second blade 20 engages and cuts hair, thus resulting in a more efficient and comfortable shave.

The primary cap surface 28 and the secondary guard surface 30 may be arcuate to provide a comfortable skin support surface. The top surface 32 of the bridge member 26 between the primary cap surface 30 and the secondary guard surface 28 may be flat. It is understood that although the bridge member 26 is shown a flat rectangular shape, numerous other shapes are also possible, such as rounded surfaces or other shapes. The top surface 32 of the bridge member 26 may be positioned on a plane P1 between a top surface 48*b* and a bottom surface 50*b* of the clip 34*b*. Although only one clip 34*b* is shown in FIGS. 2A and 2B, it is understood clip 34*a* may also have a corresponding top surface and bottom surface. As will be explained in greater detail below, the bridge member 26 (e.g., top surface 32 of the bridge member) may be spaced apart (i.e., not contacting) the clips 34*a* and 34*b* to facilitate proper shaving geometry and minimize the obstruction of the clips 34*a* and 34*b* on a shaving stroke. Accordingly, the position of the bridge member 26 (e.g., height of the bridge member 26 relative to the cutting edges 22 and 24 of the blades 18 and 20) may be independent of the clips 34*a* and 34*b*. For example, the top surface 32 of the bridge member 26 may be positioned above the top surface 48*b* of the clip 34*b* and the cutting edges 22 and 24. It is understood, the top surface 32 of the bridge member 26 may also be positioned above the top surface 48*a* of clip 34*a* (not shown) in a similar manner.

The bridge member 26 may define a cavity 52 beneath the top surface 32 of the bridge member 26. The cavity 52 may provide for improved manufacturability of the housing 12. The position of the bridge member 26 may be fixed relative to the primary guard 14. For example, the bridge member 26 and the primary guard 14 may be integrally formed as part of the housing 12. However, the cutting edges 22 and 24 may be preloaded against the bottom surface 50*b* of the clip 34*b* (and clip 34*a*, not shown). Accordingly, the cutting edges 22 and 24 may float (i.e., move in an up and down direction toward and away from the clips 34*a* and 34*b*) during a shaving stroke while the position of the bridge member 26 remains fixed. It is believed, while not being held to theory, the combination of floating blades with fixed surfaces that establish the shaving plane (e.g., the primary guard 14, the primary cap 28, the secondary guard surface 30 and the secondary cap 16) may provide a more consistent and comfortable shave.

In certain embodiments, an interblade span "S1" between the cutting edge 22 of the first blade 18 and the cutting edge 24 of the second blade 20 may be greater than 3.0 mm. For example, the interblade span "S1" between the cutting edge 22 of the first blade 18 and the cutting edge 24 of the second blade 20 may be about 3 mm to about 6 mm. In certain embodiments the interblade span S1 may be about 4.0 mm to about 5 mm. A span "S2" between the primary guard 14 and the cutting edge 20 of the first blade 18 may be about 0.5 mm to about 0.8 mm. A span "S3" between the secondary guard surface 28 and the cutting edge 22 of the second blade 20 may be about 0.3 mm to about 0.7 mm. The interblade span S1 may help minimize double engagement of hair and hysteresis, which may result in discomfort and hairs being cut below the skin surface.

The primary guard 14 may have a width "W1" of about 0.35 mm to about 0.85 mm. The bridge member 26 may have a width "W2" that is greater than W1. The width "W2" may be measured as an overall width of the bridge member 26 (in a front to rear direction) measured at a plane P2 tangent to the cuttings edges 22 and 24 (e.g., plane P2 may be at bottom surface 50*b* of the clip 34*b*). In certain embodiments, W2 may be about 1.75 mm to about 4 mm, preferably about 2 mm to about 3 mm. The width of the bridge member 26 may facilitate establishing proper shaving geometry and prevent hair from being cut below the skin surface. For example, the width W2 of the bridge member 26 may facilitate sufficient spacing between the cutting edges 22 and 24 to allow the hairs to retract back into the hair follicle after being cut by the cutting edge 22 of the first blade 18 prior to being engaged by the cutting edge 24 of the second blade 20. Furthermore, the width and spacing of the bridge member 26 may reduce double engagement of hair (e.g., when both cutting edges 22 and 24 engage the same hair at the same time). As the interblade span S1 increases (see FIG. 2A), skin bulge between the cuttings edges 22 and 24 may also increase, which may result in increased nicks and cuts. The width of the bridge member 26 may provide sufficient skin support to minimize skin bulge, which can result in nicks, cuts and discomfort, especially as the interblade span S1 increases.

In certain embodiments, the width "W2" of the bridge member 26 may be greater than 45% of the interblade blade span S1. For example, the width "W2" of the bridge member 26 may be about 50% to about 75% of the interblade blade span S1. Accordingly, if the interblade span S1 was 4.0 mm, then the width W2 of the bridge member 26 may be greater than 2.0 mm. In certain embodiments, width "W2" of the bridge member 26 may be about 60% to about 70% of the interblade blade span S1. The bridge member 26 with an increased width may provide increased skin support that results in a more comfortable shave by reducing skin bulge while also minimizing double engagement of hairs and hysteresis.

Figure 3A:
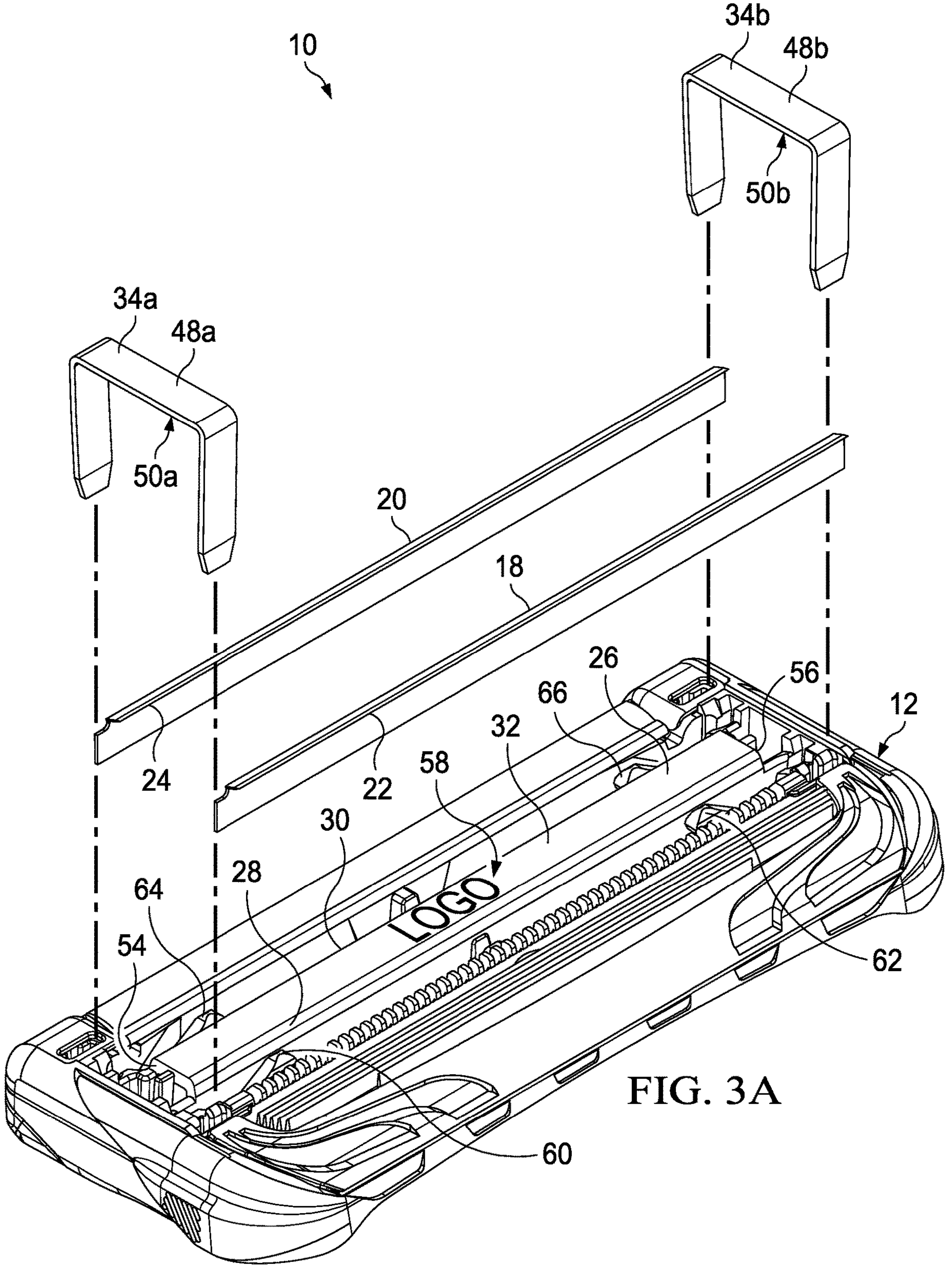
FIG. 3A is an assembly view of the shaving razor cartridge of FIG. 1.

Referring to FIG. 3A, an assembly view of the shaving razor cartridge 10 is shown. The bridge member 26 may be integrally molded as part of the housing 12. The blade 18 may be mounted to the housing 12 on a pair of spring members 60 and 62. Similarly, the blade 20 may be mounted to the housing 12 on a pair of spring members 64 and 66. The spring members 60, 62, 64 and 66 may pre-load the cutting edges 22 and 24 against the bottom surfaces 50*a* and 50*b* of the respective clips 34*a* and 34*b*. A pair of lateral ends 54 and 56 of the bridge member 26 (e.g., lateral ends of the primary cap 28 and lateral ends of the secondary guard surface 30) may be spaced apart (i.e., not in contact) from the clips 34*a* and 34*b*. Accordingly, the clips 34*a* and 34*b* may be mounted to the housing 12 at a depth independent of the bridge member 26. For example, when the clips 34*a* and 34*b* are mounted and secured to the housing 12, the top surfaces 48*a* and 48*b* of clips 34*a* and 34*b* may be approximately the same height as the top surface 32 of the bridge member 26, thus providing a more uniform shaving surface.

The top surface 32 of the bridge member 26 may allow for branding on the bridge member 26. For example, an insignia or logo 58 may be positioned on the top surface 32 by machining, etching, mold finish, painting, pad printing, etc. In certain embodiments, the top surface 32 of the bridge member 26 may have a glossy surface (e.g., 6000 Grit Diamond Buff to 1200 grit diamond buff) to improve glide during a shaving stroke. The bridge member 26 may be coated (poly-para-Xylylene or PTFE) or plated (e.g., chrome plating) to improve lubricity. Alternatively, top surface 32 of the bridge member 26 may have a very rough surface to provide for exfoliation of the skin during a shaving stroke (e.g., 600 grit stone or less).

Figure 3B:
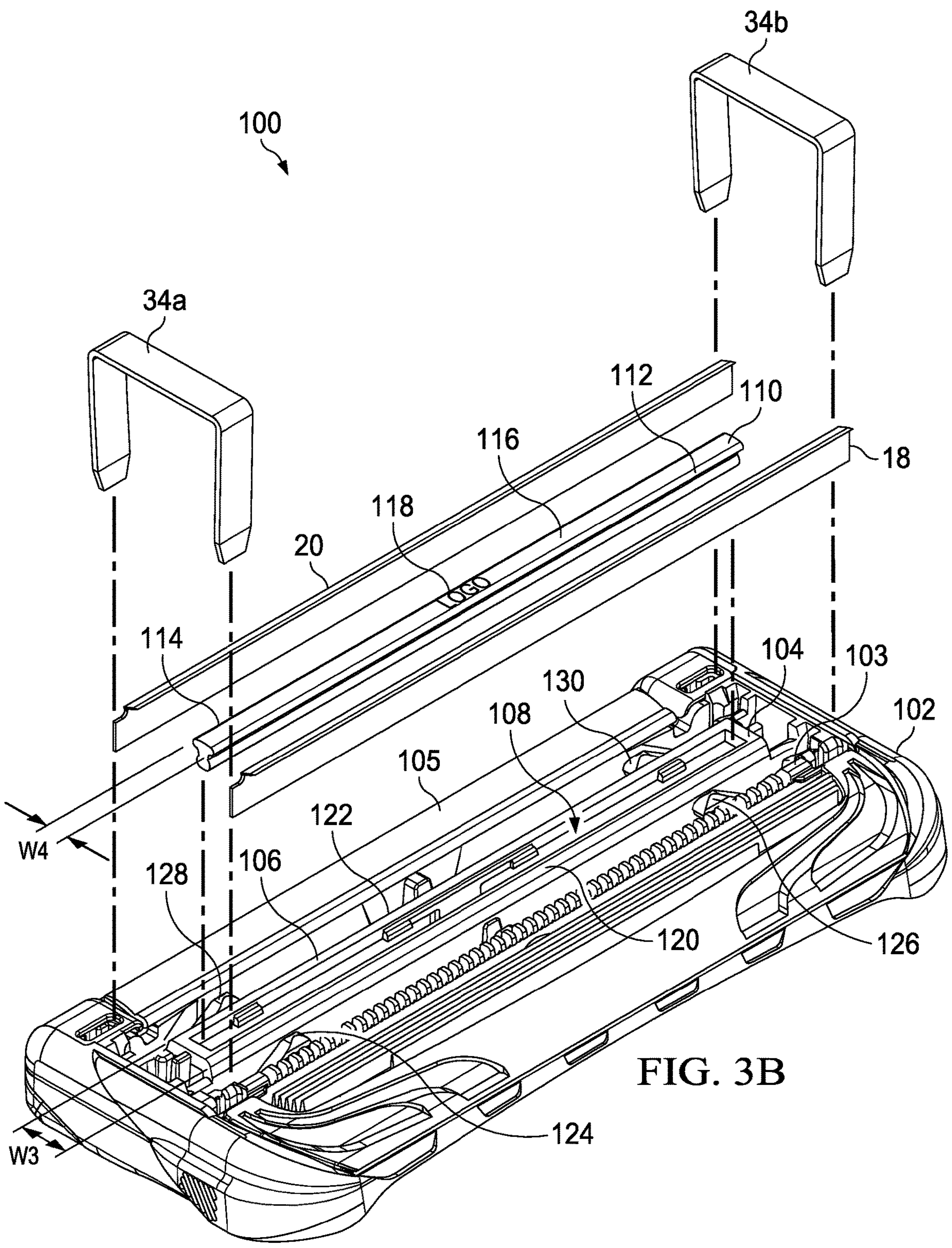
FIG. 3B is an assembly view of another possible embodiment of a shaving razor cartridge.

Referring to FIG. 3B, an assembly view of a second possible embodiment of a shaving razor cartridge 100 is shown having a housing 102 with a bridge member 104 comprising a water leachable shaving aid. The bridge member 104 may be substituted for the bridge member 26 in the shaving cartridge 10 of FIG. 3A. For example, the bridge member 104 may be integrally molded as part of the housing 102 between a primary guard 103 and a secondary cap 105 on the housing, as previously described for bridge member 26. The bridge member 104 may include a top surface 106 that defines an opening 108 configured to receive a lubrication member 110. The opening 108 may be a recess or extend completely through the bridge member 104. However, it is understood that the lubrication member 110 is optional. For example, in certain embodiments, the opening 108 may be left open to allow for improved rinsing and debris removal. The lubrication member 110 may comprise one or more water leachable shaving aids. The water leachable shaving aid may be formed by an injection molding, extrusion, or thermal/ultrasonic compression manufacturing process. The bridge member 104 (e.g., the lubrication member 110) may provide a primary cap surface 112 and a secondary guard surface 114. Accordingly, the lubrication member 110 may provide for lubrication behind the first blade 18 and in front of the second blade 20, which may reduce irritation or eliminate the need for shave prep. The primary cap surface 112 and/or the secondary guard surface 114 may be arcuate to provide a comfortable skin support surface. The lubrication member 110 of the bridge member 104 may have a top surface 116 between the primary cap surface 112 and the secondary guard surface 114. The top surface 116 may allow for branding, as previously described above. For example, a logo 118 may be positioned on the top surface 116.

When the clips 34*a* and 34*b* are secured to the housing 102, the clips 34*a* and 34*b* may be approximately the same height as the top surface 116 of the lubrication member 110 and/or the primary cap surface 112 and the secondary guard surface 114, thus providing a more uniform shaving surface. Similar to the shaving razor cartridge 10 of FIG. 3A, the clips 34*a* and 34*b* may be spaced apart from the bridge member 104 and/or the lubrication member 110. The bridge member 104 may have a width “W3” from a forward edge 120 to a rear edge 122 of about 1.5 mm to about 4 mm from the primary cap surface 112 to the secondary guard surface 114. The lubrication member 110 may have a width “W4” of about 1.5 mm to about 4 mm. The width of the bridge member 104 and/or the lubrication member 110 may allow for proper shaving geometry to minimize double engagement of hairs and prevent hair from being cut below the skin surface.

The blades 18 and 20 may each be mounted on a pair of respective spring fingers 124, 126, 128 and 130. As previously described for the shaving razor cartridge 10 of FIG. 3A, the clips 34*a* and 34*b* may be mounted over the blades 18 and 20, but not the bridge member 104. The clips 34*a* and 34*b* may then be secured to the housing 102. The spring fingers 124, 126, 128 and 130 may lift the respective blades 18 and 20 against the clips 34*a* and 34*b*. The independent movement of the blades 18 and 20 relative to the bridge member 104 may provide a more comfortable shave by providing a more consistent shaving geometry. As previously shown and described in FIG. 2B, the blade 20 may be spaced apart from the bridge member 104 to provide for improved rinsing.

Figure 3C:
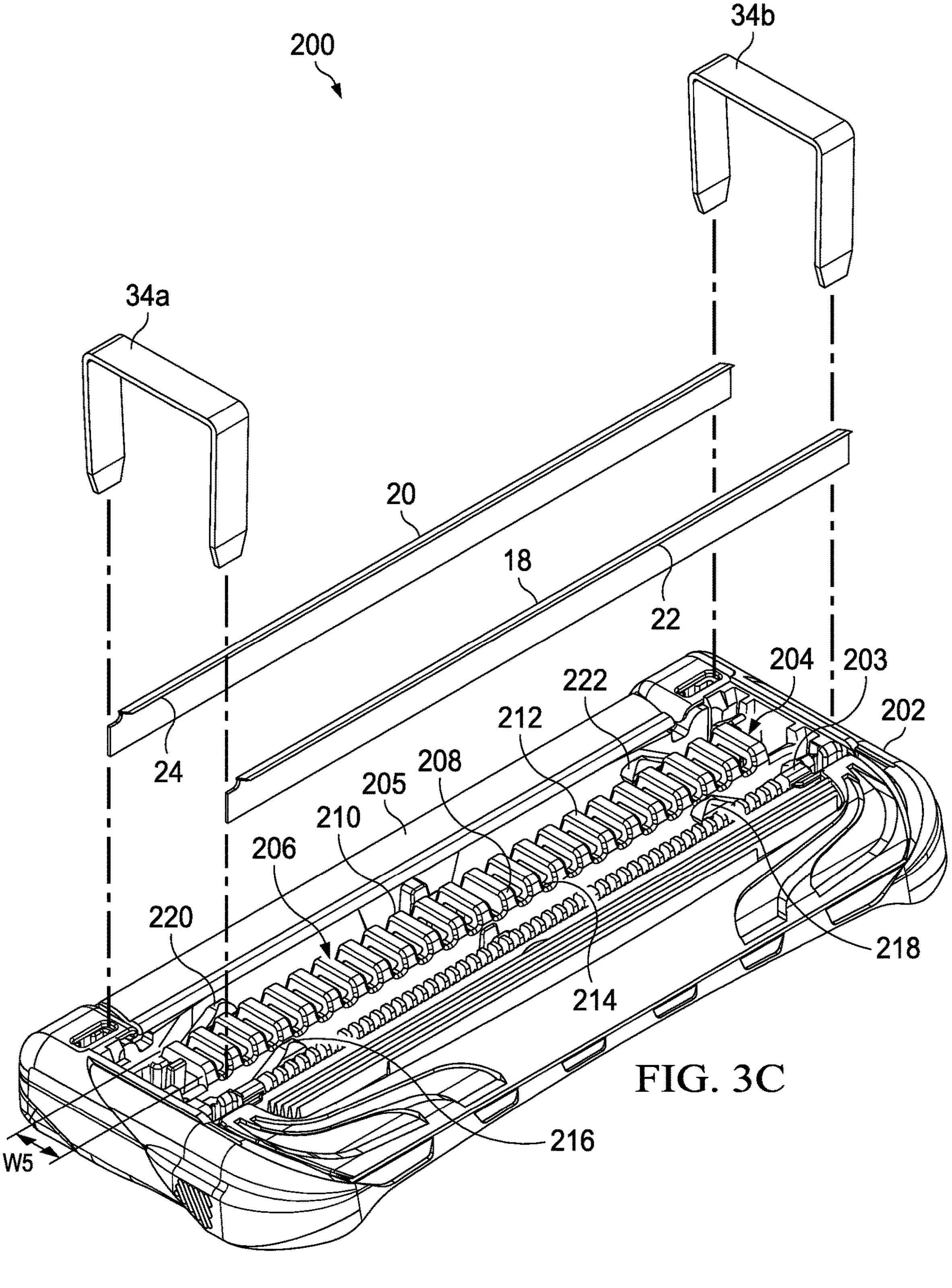
FIG. 3C is an assembly view of another possible embodiment of a shaving razor cartridge.

Referring to FIG. 3C, an assembly view of a third possible embodiment of a shaving razor cartridge 200 is shown having a housing 202 with a bridge member 204 comprising a plurality of spaced apart parallel ribs 206 that extend transverse to the cutting edges 22 and 24 of the blades 18 and 20. The housing 202 may be similar to the housing 12 previously shown and described in FIG. 3A, with the exception that the bridge member 204 may be substituted for the bridge member 26. The bridge member 204 may be integrally molded as part of the housing 202 between a primary guard 203 and a secondary cap 205 on the housing 202. The bridge member 204 may provide similar benefits as the bridge member 26 previously described. The spaced apart parallel ribs 206 may provide the added benefit of aligning hairs in front of the second blade 20 to improve cutting efficiency. The plurality of spaced apart parallel ribs 206 may provide a primary cap surface 208 and a secondary guard surface 210. The bridge member 204 may have a top surface 212 extending between the primary cap surface 208 and the primary guard surface 210. The bridge member 204 may have a width “W5” from the primary cap surface 208 to the secondary guard surface 210 of about 1.5 mm to about 4 mm. The width of the bridge member 204 may allow for proper shaving geometry to minimize double engagement of hairs and prevent hair from being cut below the skin surface. The plurality of spaced apart parallel ribs 206 may define a plurality of corresponding rinse openings 214 extending thru the bridge member 204 to aid in the removal of cut hair and excess shave prep or soap.

The blades 18 and 20 may each be mounted on a pair of respective spring fingers 216, 218, 220 and 222. As previously described for the shaving razor cartridge 10 of FIG. 3A, the clips 34*a* and 34*b* may be mounted over the blades 18 and 20, but not the bridge member 204. As previously described for the other embodiments, the blade 20 may be spaced apart from the bridge member 204 to provide for improved rinsing. The clips 34*a* and 34*b* may then be secured to the housing 12. The spring fingers 216, 218, 220 and 222 may lift the respective blades 18 and 20 against the clips 34*a* and 34*b*. The independent movement of the blades 18 and 20 relative to the bridge member 204 may provide a more comfortable shave by providing a more consistent shaving geometry.

Figure 4A:
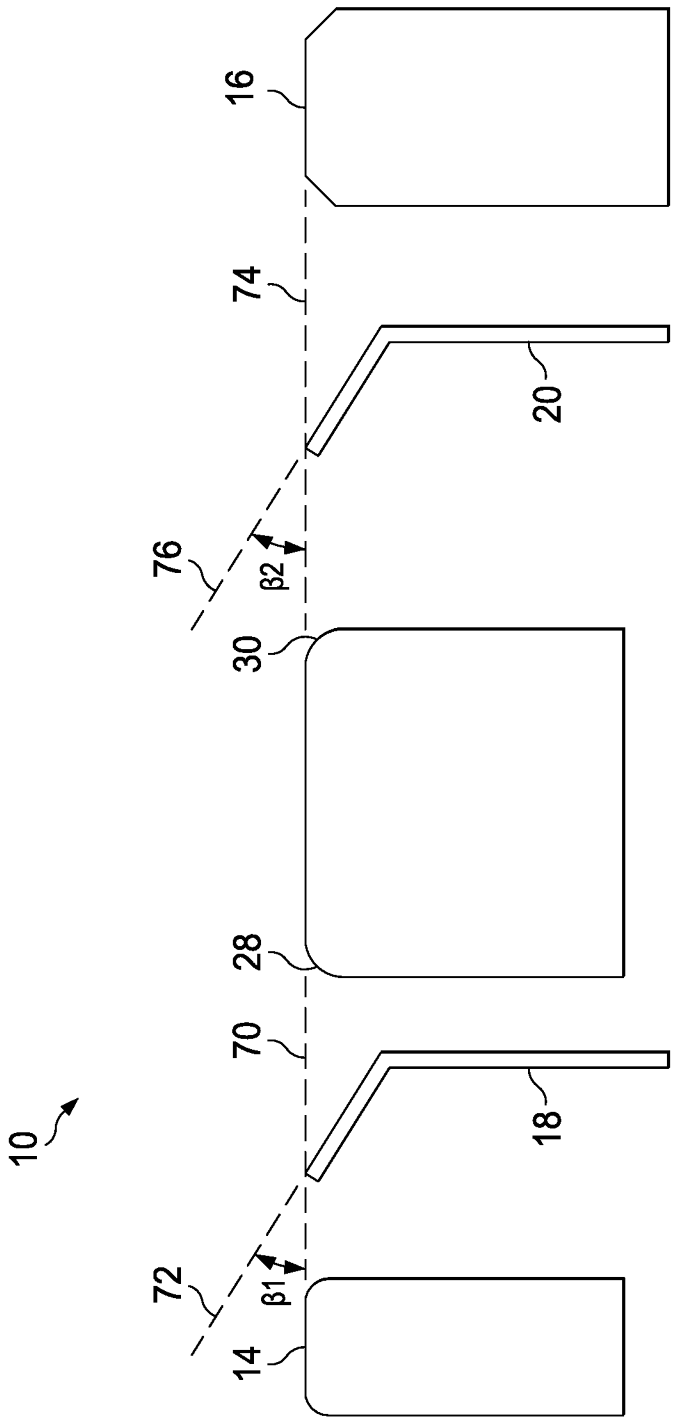
FIG. 4A is a schematic view of the shaving razor cartridge of FIG. 1.

Referring to FIG. 4A, a possible schematic view of the shaving razor cartridge 10 of FIG. 1 is shown. Another factor, which can influence drag forces associated with the blades, is the blade tangent angle or BTA. The shaving razor cartridge 10 may have a first shaving plane 70 tangent to the primary guard 14 and the primary cap surface 28. The first shaving plane 70 may intersect a blade plane 72 of the first blade 18 at a first blade tangent angle β1. The shaving razor cartridge 10 may have a second shaving plane 74 tangent to the secondary guard surface 30 and the secondary cap 16. The second shaving plane 74 may intersect a second blade plane 76 of the second blade 20 at a second blade tangent angle β2. A lower blade tangent angle may result in a more comfortable shave for the shaving razor cartridge 10. In certain embodiments, the first blade tangent angle β1 may be about 15 degrees, for example 10 degrees to 25 degrees. It is not necessary for both blades 18 and 20 to have the same blade tangent angles. For example, the second blade tangent angle β2 may be less than the blade tangent angle β1 of the first blade 18, for example about 10 degrees. It is understood that the shaving razor cartridges 100 and 200 shown in FIGS. 3B and 3C, respectively, can have the same blade tangent angles as described in FIG. 4.

Figure 4B:
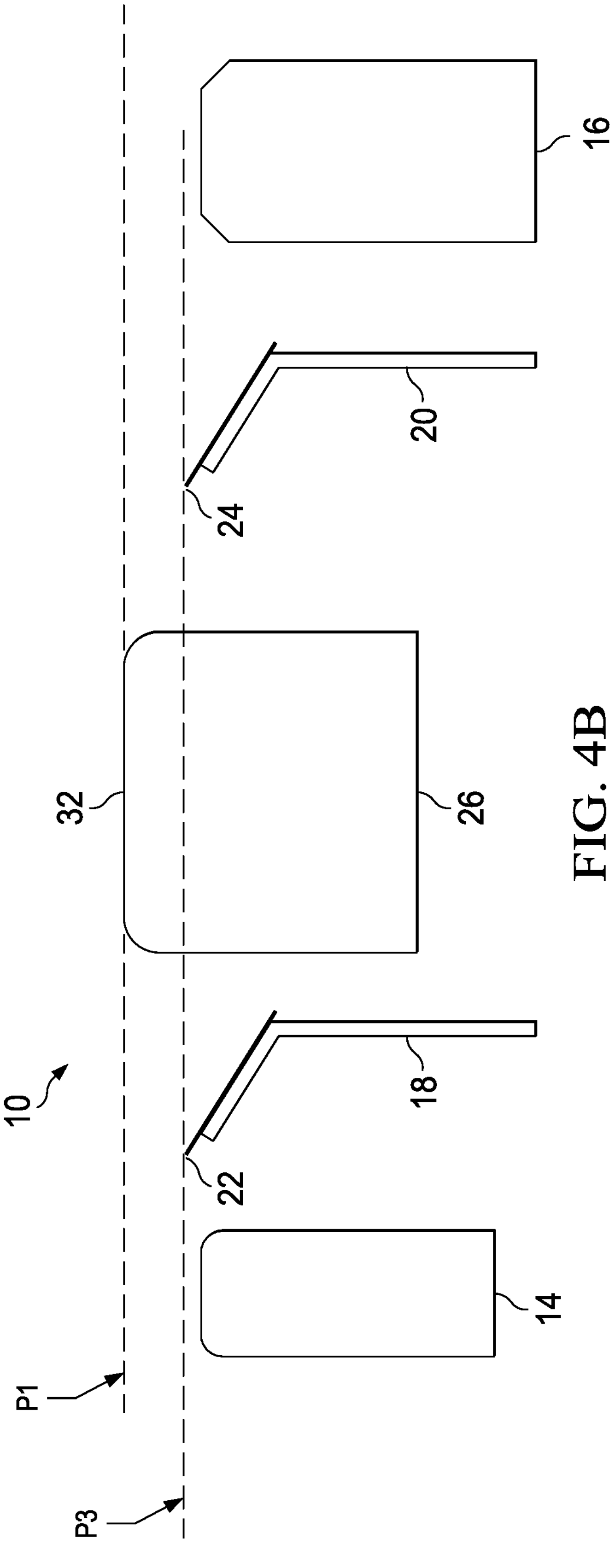
FIG. 4B is another schematic view of the shaving razor cartridge of FIG. 1.

Referring to FIG. 4B, a possible schematic view of the of the shaving razor cartridge 10 of FIG. 1 is shown. In certain embodiments, the top surface 32 of the bridge member 26 may be positioned independently of the position of the cutting edge 22 and the cutting edge 24 (e.g., the bridge member 26 may not be registered against the clips 34*a* and 34*b*). The top surface 32 of the bridge member 26 may not be positioned on a same plane as the cutting edge 22 of the blade 18 and may not be positioned on the same plane as the cutting edge 24 of the second blade 20. For example, the top surface 32 of the bridge member 26 may be positioned on the plane P1 about 0.01 mm above a plane P3 tangent to the cutting edge of the first blade 18 and tangent to the cutting edge 24 of the second blade 20 to about 0.20 mm above the plane P3. The positioning of the top surface 32 of the bridge member 26 above the plane P3 may provide for improved comfort by decreasing loading of the cutting edges 22 and 24 on the skin. However, the top surface 32 may be positioned so it is not so far above the plane P3 that the cutting edges 22 and 24 do not efficiently cut hair. Accordingly, the comfort of a shave may be further increased by reducing both the hysteresis effect and decreasing blade load (i.e., pressure applied to the skin by the cutting edge of a blade). The comfort level of a shave may be controlled completely independently of the position of the clips 34*a* and 34*b*, which determine the position of the blade edges 22 and 24. The primary guard 14 and the secondary cap 16 may be positioned below the cutting edges 22 and 24 and/or the top surface of 32.

Figure 4C:
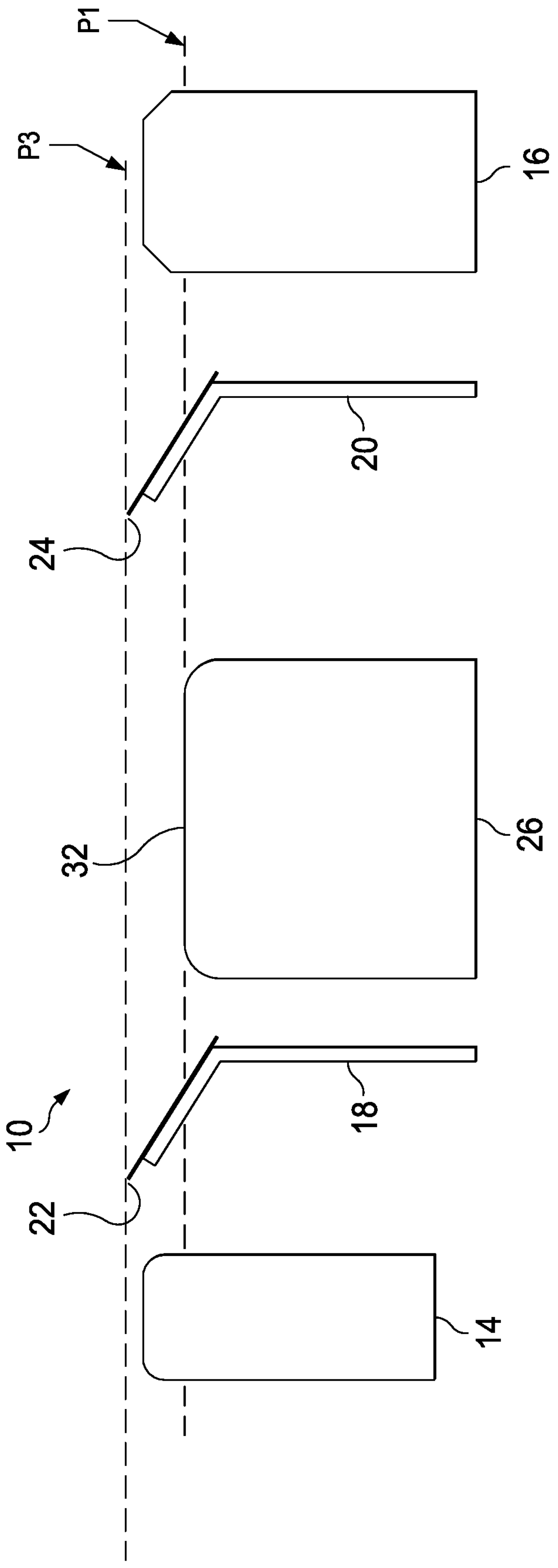
FIG. 4C is another schematic view of the shaving razor cartridge of FIG. 1.

Referring to FIG. 4C, a possible schematic view of the of the shaving razor cartridge 10 of FIG. 1 is shown. The top surface 32 of the bridge member 26 of the shaving razor cartridge 10 may be positioned below the shave plane P3 that is tangent to the cutting edges 22 and 24 of the first blade 18 and second blade 20, respectively. For example, the top surface 32 of the bridge member 26 may be positioned on the plane P1 about 0.01 mm below the plane P3 to about 0.15 mm below the plane P3. The top surfaces of the primary guard 14 and the secondary cap 16 may be positioned between the plane P3 and the plane P1. Accordingly, a shave may be provided that has very little hysteresis effect, but the cutting edges 22 and 24 have an increased blade load on the skin, thus engaging the hair better for a closer shave.

Dimensions should not be held to an impossibly high standard of metaphysical identity that does not allow for discrepancies due to typical manufacturing tolerances. Therefore, the term "about" should be interpreted as being within typical manufacturing tolerances.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaving razor cartridge comprising:

a housing having a primary guard at a front of the housing and a secondary cap at a rear of the housing;

a bridge member integrally molded as part of the housing, the bridge member comprising a plurality of spaced apart parallel ribs, the plurality of spaced part ribs defining a primary cap surface and a secondary guard surface;

a first blade having a cutting edge, the first blade mounted to the housing between the primary guard and the primary cap surface;

a second blade having a cutting edge extending in a same direction as the cutting edge of the first blade, the second blade is mounted to the housing between the secondary guard surface and the secondary cap, the cutting edge of the first blade and the cutting edge of the second blade define an interblade span greater than 3.0 mm, wherein the plurality of spaced apart parallel ribs define a plurality of rinse openings extending through the bridge member.

2. The shaving razor cartridge of claim 1 wherein the bridge member is spaced apart from a blade support member of the first blade.

3. The shaving razor cartridge of claim 1 wherein the first blade and the second blade are the only blades mounted to the housing.

4. A method of making a shaving razor cartridge comprising:

integrally forming as part of a housing with a primary guard, a bridge member with a plurality of spaced apart parallel ribs defining a primary cap surface, a secondary guard surface and a plurality of rinse openings extending through the bridge member mounting a first blade to a pair of spring members of the housing, between the primary guard and the primary cap surface;

mounting a second blade to a second pair of spring fingers between the primary guard and a secondary cap on the housing to define an interblade span greater than 3.0 mm.

5. The method of claim 4 further comprising mounting a pair of clips to the housing.

* * * * *